United States Patent [19]

Davis

[11] Patent Number: 4,471,678
[45] Date of Patent: Sep. 18, 1984

[54] RING SAW FOR CUTTING A TUBE

[75] Inventor: Jean Claude Davis, Sainte Foy les Lyon, France

[73] Assignee: Machines, Outils J. C. Davis Société à Responsabilité Limitée, Irigny, France

[21] Appl. No.: 469,385

[22] Filed: Feb. 24, 1983

[30] Foreign Application Priority Data

Mar. 1, 1982 [FR] France ................................ 82 03648

[51] Int. Cl.³ ............................................ B23D 45/08
[52] U.S. Cl. ....................................... 83/483; 83/646; 51/73 R
[58] Field of Search ....................... 83/469, 471.2, 483, 83/491, 646, 647.5; 51/73 R; 125/15; 82/70.2, 72, 77

[56] References Cited

FOREIGN PATENT DOCUMENTS 2388625 11/1978 France .
166935 4/1959 Sweden ................................ 83/646

*Primary Examiner*—James M. Meister
*Attorney, Agent, or Firm*—Karl F. Ross; Herbert Dubno

[57] ABSTRACT

A ring-blade saw for cutting a tube generally centered on a tube axis has a subtantially stationary base, an outer frame displaceable in a straight line in a plane, and an actuator connected between the base and the outer frame for displacing the frame relative to the base in the plane. An inner support is carried by a first guide on the frame for movement relative to the frame in a first straight direction lying in the plane and by a second guide for movement of the support relative to the frame in a second straight direction lying in the plane and perpendicular to the first direction. A generally planar, annular and internally toothed saw blade lying generally on the plane, centered on a saw axis generally perpendicular to the plane, and carried on the support can be rotated on the support about this saw axis. Thus the tube to be cut can extend through the blade with its axis parallel to or on the blade axis. A drive including a crank is connected between the frame and the support for orbiting the saw axis about the tube axis of a tube extending perpendicular to the plane through the blade. Thus when the blade is being rotated and orbited it can cut through the tube passing through it.

16 Claims, 7 Drawing Figures

RING SAW FOR CUTTING A TUBE

FIELD OF THE INVENTION

The present invention relates to a ring saw of the type used to cut a tube. More particularly this invention concerns such a saw used for the precision cutting of large-diameter tubing in a large-scale production process.

BACKGROUND OF THE INVENTION

Although cutting a small-diameter tube with a high degree of precision is a relatively simple affair, it is much more difficult to cut a large-diameter tube both precisely and rapidly. Rotating the tube about its center axis, lathe-fashion, while engaging it radially with one or more cutoff tools forms a very precise cut but is an unwieldly and slow process. A circular saw must have a diameter at least twice as great as that of the workpiece being cut, and can deflect somewhat at its outer rim so that the cut is not perfectly smooth and square.

Accordingly a so-called ring saw has been developed. Such a saw, as described in my French Pat. No. 2,388,625 filed Apr. 29, 1977, has an outer frame displaceable in a normally vertical plane by an appropriate actuator and carrying an inner support. A generally planar, annular and internally toothed saw blade lying generally on the plane and centered on a saw axis generally perpendicular to the plane is carried on this support. Means is provided for rotating the blade on the support about the saw axis. A drive is provided connected between the frame and the support for displacing the inner support carrying the saw so this saw orbits about the tube axis of a tube extending perpendicular to the plane through the blade. Thus when the blade is being rotated and orbited it can cut through the tube. The cut formed by such a machine is fairly good and the process is relatively rapid.

The orbiting movement in this arrangement is obtained by mounting the support on the outer ends of a plurality of parallel cranks whose inner ends are pivoted on the support. These cranks are synchronously rotated to move the support through the orbit circle. Such a crank structure is very hard to adjust for different sizes of tube, is rarely very rigid, and quickly wears so the cut produced by the saw becomes inaccurate.

In this system the frame can move to bring the saw into initial engagement and out of terminal engagement with the workpiece. Thus the system can be positioned so a new tube section can be fitted easily through it. This frame movement is pivotal about an axis parallel to the saw and normally results in the start of the cut being somewhat out of line with and not chamfered like the rest of the cut.

OBJECTS OF THE INVENTION

It is therefore an object of the present invention to provide an improved ring-type saw of the above-described general type.

Another object is the provision of such a ring-type saw which overcomes the above-given disadvantages.

A further object is to provide a robust and accurate style of orbital movement for the saw blade.

A yet further object is to provide such a saw where the initial cut can be controlled accurately so that the cut is perfectly accurate and chamfered right from the start.

SUMMARY OF THE INVENTION

These objects are attained according to the instant invention in a ring-blade saw which cuts a tube generally centered on a tube axis and which has a substantially stationary base, an outer frame displaceable in a straight line in a plane, and means connected between the base and the outer frame for displacing the frame relative to the base in the plane. An inner support is carried by a first guide on the frame for movement relative to the frame in a first straight direction lying in the plane, and by a second guide for movement of the support relative to the frame in a second straight direction lying in the plane and perpendicular to the first direction. A generally planar, annular and internally toothed saw blade lying generally on the plane, centered on a saw axis generally perpendicular to the plane, and carried on the support can be rotated on the support about this saw axis. Thus the tube to be cut can extend through the blade with its axis parallel to or on the blade axis. A drive including a crank is connected between the frame and the support for orbiting the saw axis about the tube axis of a tube extending perpendicular to the plane through the blade. Thus when the blade is being rotated and orbited it can cut through the tube.

In this manner the support for the blade is accurately guided so it can form a perfect cut. When tube size changes one need merely change or adjust the length of the crank, and only one such crank is needed so such adjustment is relatively simple. What is more the entire blade can move in a straight line, normally radially of itself and of the workpiece, into initial engagement with the workpiece so the cut is correct right from the start.

According to this invention the crank has one end pivoted on the frame about an axis perpendicular to the plane and another end pivoted on the frame about an axis also perpendicular to the plane but offset from the other crank axis. The length of the crank between these axes is adjusted to be equal to or slightly less than the inner radius of the tube being cut. The drive means carrying the crank includes a motor carried on the frame and having an output shaft forming the other crank axis. Thus this drive can be quite simple and will operate without looseness to make a nearly perfect cut.

The blade actuation means according to the invention includes a motor and transmission fixed on the support and connected to the blade. This assembly is also mounted right where it works, so that transmission losses and looseness are avoided and an accurate cut is obtained.

Each of the guides in accordance with this invention includes at least one rod extending in the respective direction and a slide displaceable along the respective rod in the respective direction. In addition the slides are each constituted as roller-type bearings.

More particularly the first and second guides each include two respective first and second rods extending parallel to the respective directions and at least two respective first and second slides displaceble along the respective rods in the respective directions. The first rods are fixed on the frame, the first slides are fixed on the ends of the second rods, and the second slides are fixed on the support. As mentioned above in this system the first direction is vertical and the second direction is horizontal. In addition the straight-line movement of the frame is vertical.

According to another feature of this invention the means for displacing the frame relative to the base includes a lever pivoted on the base, a fluid-powered actuator connected between the base and the lever for pivoting same, a rigid link connected between the lever and the frame, and an adjustable stop operatively engageable between the frame and the base for limiting displacement of the frame relative to the base along the straight line. Thus the stop is positioned in accordance with the size of the tube being cut. This stop has a stop drive motor, a wedge engageable with the stop, and transmission means connected between the wedge and stop motor for displacing the wedge and stop by means of the motor. In this manner the initial cut will be to the perfect depth so that at this region the cut will be perfectly accurate and chamfered.

This accuracy is further ensured when, according to this invention, the saw has support means for holding the tube to be cut fixedly in a position extending through the blade and having in turn a support surface oriented to hold the lowermost portion of the tube at a predetermined level regardless of workpiece size. Thus the starting position of the workpiece is always the same so that the uppermost position of the frame can be set according to tube diameter, just as the crank length is set about equal to the difference between the inner radii of the blade and tube being cut.

DESCRIPTION OF THE DRAWING

The above and other features and advantages will become more readily apparent from the following, reference being made to the accompanying drawing in which.

SPECIFIC DESCRIPTION

Figure 1:
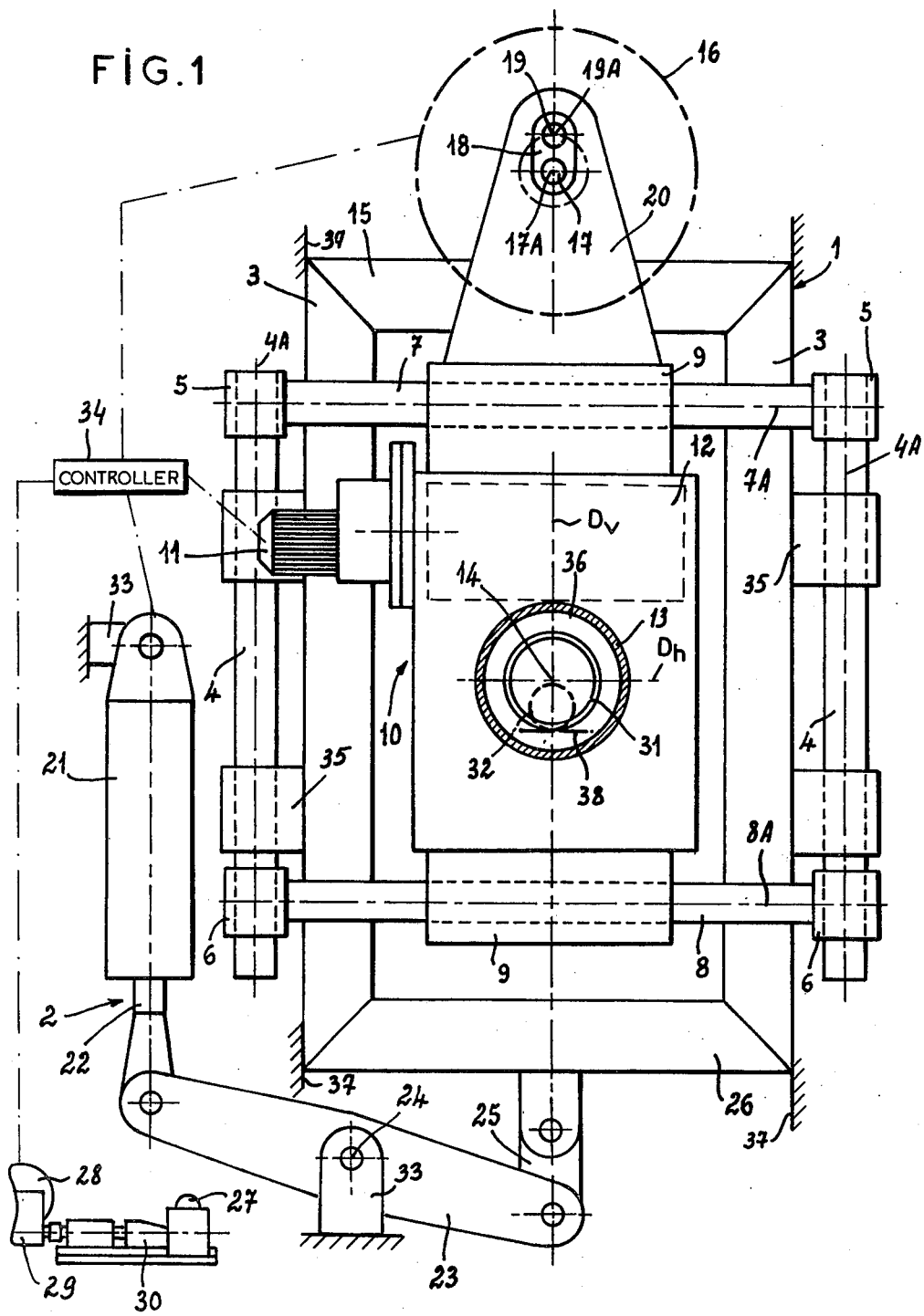
FIG. 1 is an end view of the saw according to this invention.

As seen in FIG. 1 a saw according to this invention has a large rectangular outer frame 1 here lying in a vertical plane parallel to the plane of the view. This frame 1 comprises a pair of vertical side members 3 bridged horizontally by top and bottom members 15 and 26. It can be displaced vertically in the direction $D_v$ in guides illustrated schematically at 37 by an actuator 2.

This actuator 2 in turn comprises a fluid-powered cylinder 21 mounted on a stationary machine base 33 like the guides 37 and having a piston rod 22 connected to an outer end or arm of a first-class lever pivoted on the base 33 about a horizontal pivot axis 24 and having an opposite inner arm or end connected via a rigid link 26 to the bottom frame member 26.

Downward excursion of the outer arm of the lever 23 is limited by a stop 27 which can be moved up and down by a horizonally slidable wedge 30 moved via a worm-type stepdown gear 29 and stepping motor 28 operated by a controller 34.

Fixed by lugs 35 to the side members 3 of the frame 1 are respective cylindrical guide rods 4 centered on vertical axes 4A parallel to the direction $D_v$. A pair of upper ball-bearing guide sleeves 5 and a pair of identical lower guide sleeves 6 can slide along these axes 4A on the guide rods 4, with each rod 4 having one sleeve 5 above its two lugs 35 and one sleeve 6 therebelow. The upper sleeves 5 are carried at the outer ends of an upper horizontal guide rod 7 and the lower sleeves 6 at the outer ends of a lower horizontal guide rod 8. These rods 7 and 8 have respective axes 7A and 8A which are coplanar with the axes 4A but perpendicular thereto.

In turn an inner support 10 has vertically spaced upper and lower ball-bearing guides 9 riding on these rods 7 and 8. Thus the support 10 can move vertically in the direction $D_v$ parallel to the axes 4A by sliding of the sleeves 5 and 6 on the rods 4 and horizontally in a direction $D_h$ parallel to the axes 7A and 8A by sliding of the guides 9 on the rods 7 and 8. Such motion is extremely accurately controlled so that the inner support 10 will not move appreciably relative to the frame 1 except in the orthogonal directions $D_v$ and $D_h$.

The frame 1 carries a fluid or electrically powered motor 16 having an output shaft 17 that can rotate about an axis 17A perpendicular to the plane of the axes 4A, 7A, and 8A and that is fitted with a variable-length crank arm 18 whose other end is fitted over a rod 19 centered on an axis 19A parallel to the axis 17A and pivoted in a flange 20 extending upward from the upper guide 9 of the support 10. In this manner the motor 16 can force the axle 19A to orbit about the axis 17A, thereby identically moving the inner support 10 on the guides 4, 7, and 8 in a circle of a radius equal to the distance between the axes 17A and 18A.

This inner support 10 is fitted with an annular and internally toothed saw blade 13 centered on a horizontal axis 14 perpendicular to the above-mentioned plane of the axes 4A, 7A, and 8A. The blade 13 can be rotated in the support 10 about the axis 14 by means of a motor 11 connected through worm-type stepdown gearing in the region indicated at 12 to the blade 13. The blade 13 forms a horizontally open passage 36 that is also centered on the axis 14, and can be formed of an annular succession of toothed segments of tool steel, monel or alloy steel, ceramic, diamond, or any appropriate heavy-duty sawing material. The actual cutting element, which can saw by the fusion process at very high speed, can itself be sandwiched between a pair of annular carriers.

To either side of the apparatus there is a workpiece holder having an upper surface indicated at 38. A workpiece, normally a cylindrical tube 31 having a central axis 31A (FIG. 2), to be cut is clamped down against this surface 38 by standard vises or holders, with the tube 31 projecting axially completely through the opening 36 of the machine.

The saw according to the instant invention operates as follows:

The device is first set by providing it with a crank arm 18 having an effective length between the axes 17A and 19A equal to slightly less than the internal radius of the tube 31 to be cut. Similarly the stop 27 is set so the frame 1 can only be raised through a distance equal to slightly more than the difference between the internal radii of the saw blade 13 and of the tube 31. In fact this stop 27 is normally set according to tube wall thickness, that is so the frame 1 can move up through a distance raising the lowermost saw teeth above the surface 38 by a distance slightly greater than the tube wall thickness.

To start with as shown in FIG. 1 the tube 31 is engaged through the passage 36 in a position of the apparatus with the frame 1 down, the support 10 central on the rods 7 and 8 and raised on the rods 4, so that the tube axis and saw-blade axis 14 are coaxial. In this position the tube 31 is clamped to both sides of the support 10 so that its lowermost portion lies on the surfaces 38 and its axis 31A lies on the axis 14 with all-around clearance between the tube 31 and the saw 13.

Figure 2:
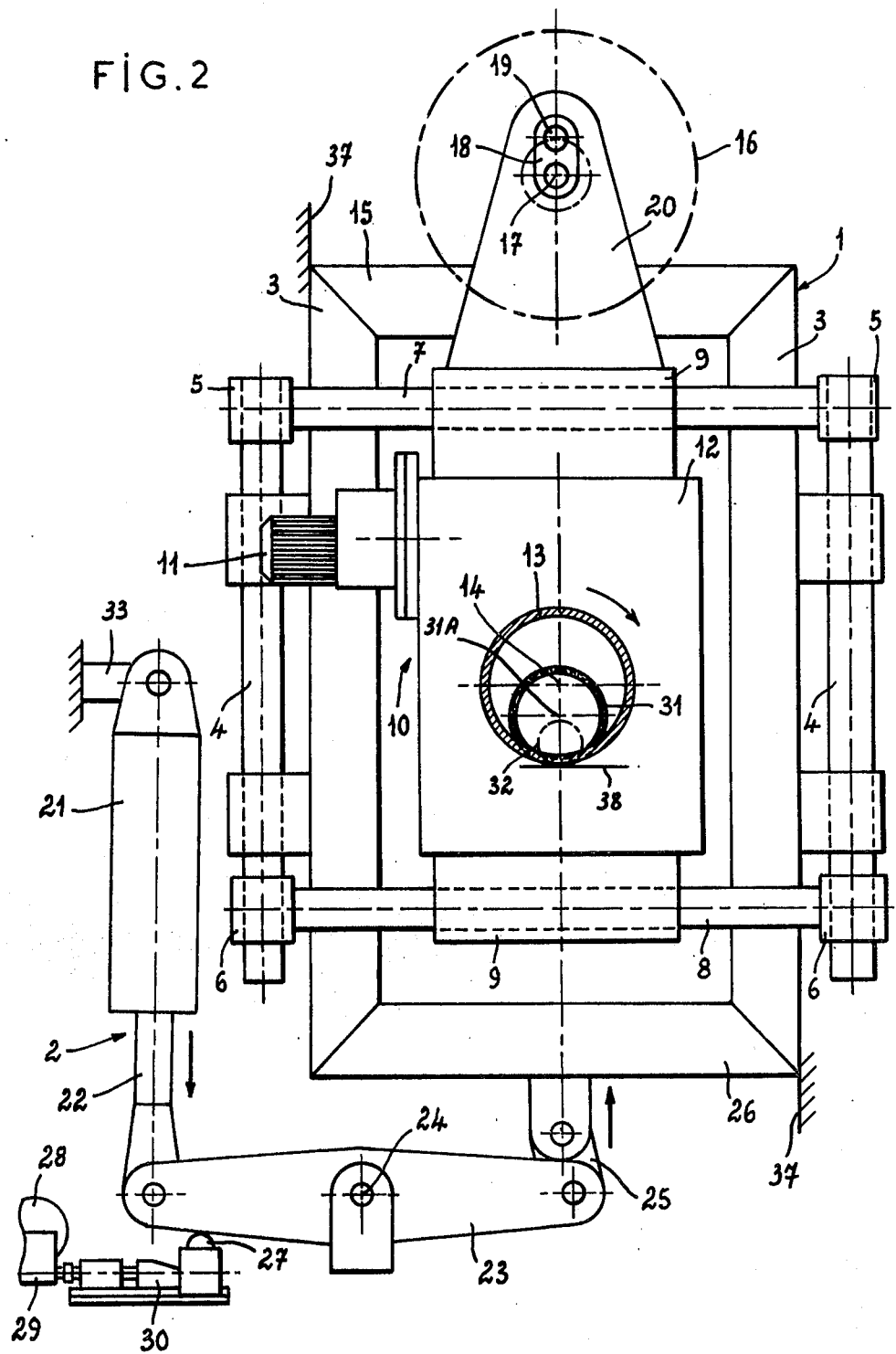
FIGS. 2–7 are views like FIG. 1 but showing the saw in successive different operational positions.
Figure 3:
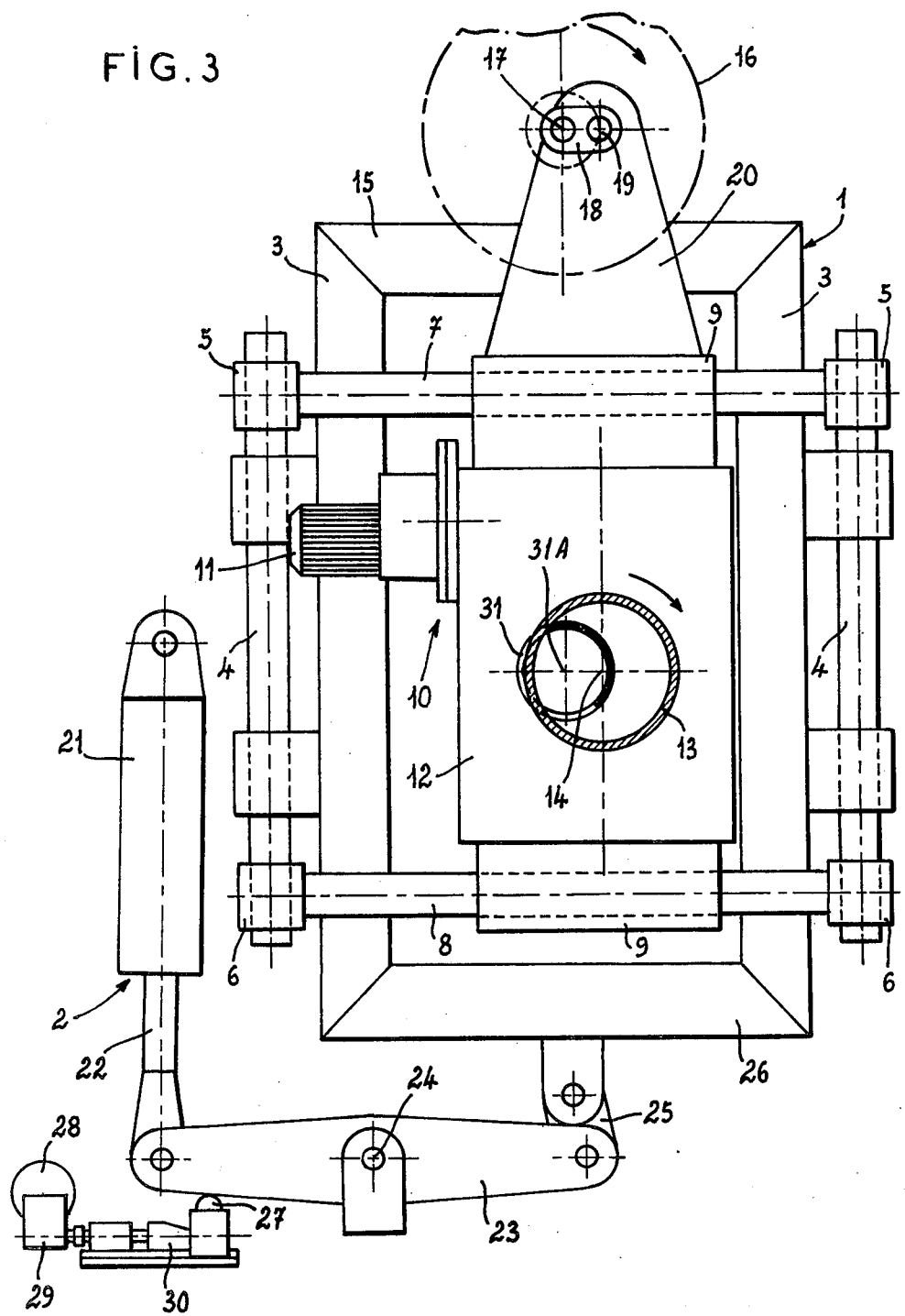
Figure 4:
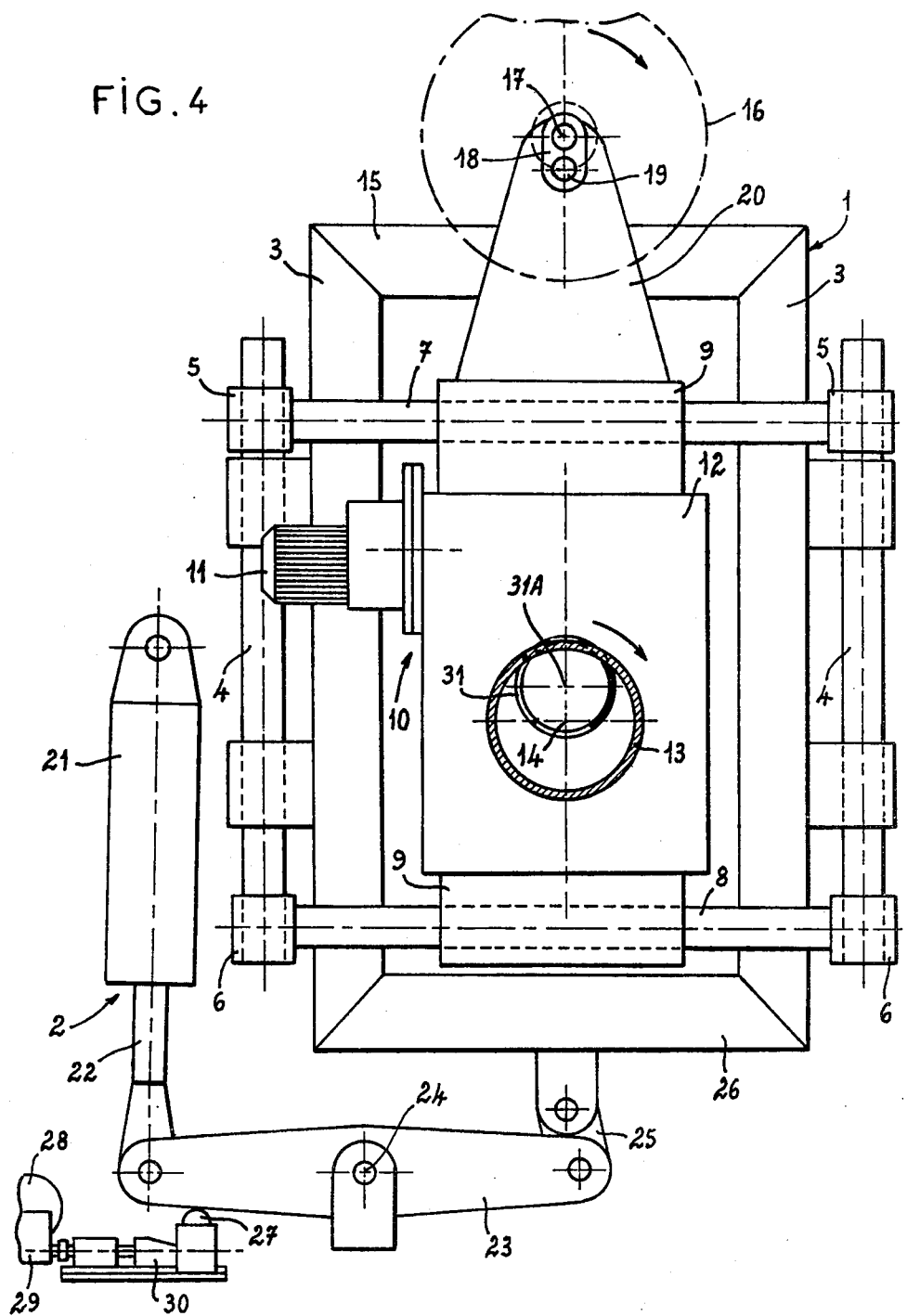
Figure 5:
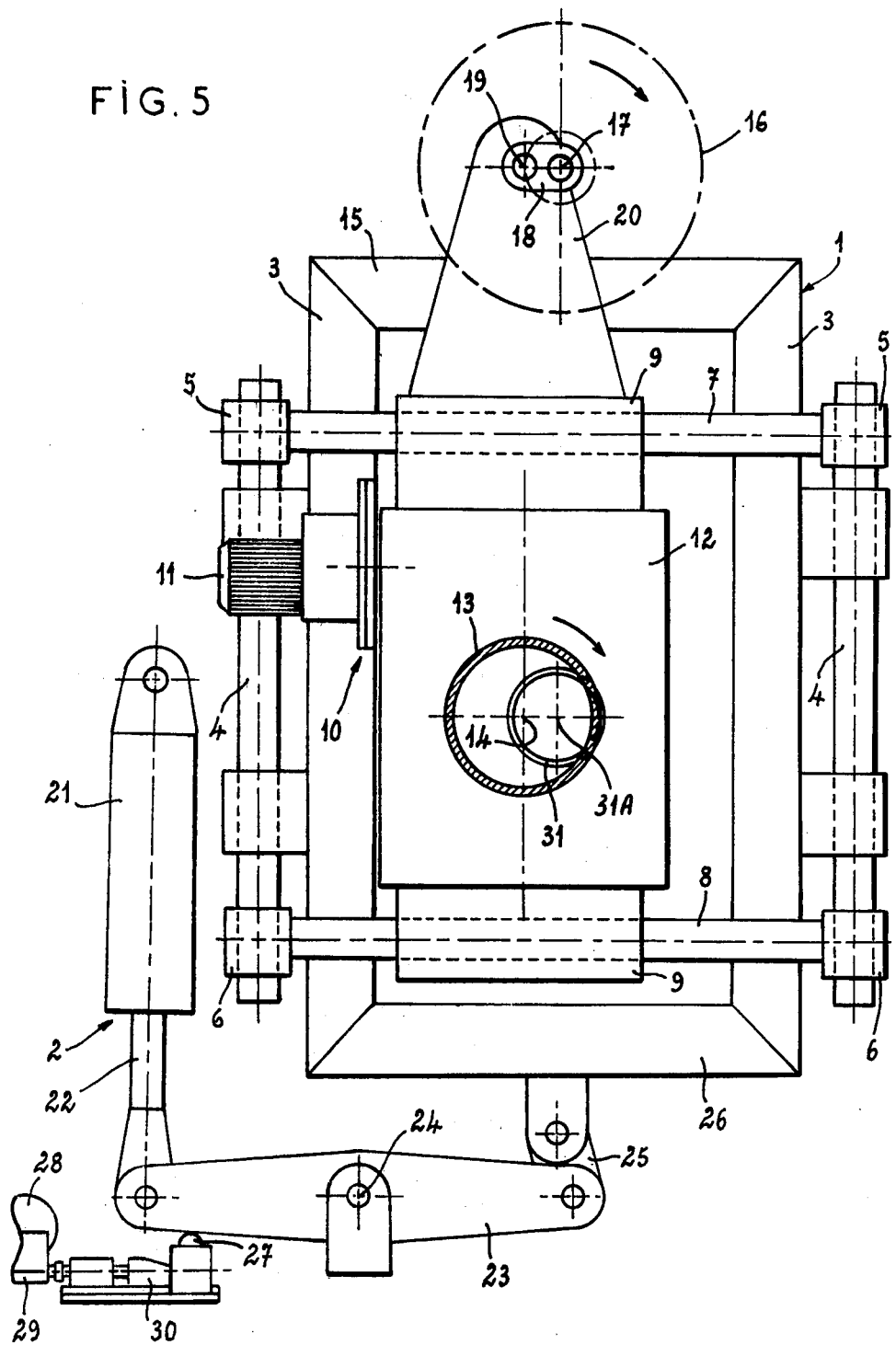

Thereupon as shown in FIG. 2 the drive 11 starts to rotate the blade 13 about its axis 14 and the actuator 2 is extended down to the stop 27 to raise the frame 1 and support 10 so the blade 13 cuts into the bottom of the tube 1 and, in fact cuts it through.

Approximately simultaneously the controller 34 starts the drive motor 16 to orbit the saw axis 14 about the workpiece axis 31A so it describes thereabout a circle having a diameter slightly smaller than the inner diameter of this workpiece.

Figure 6:
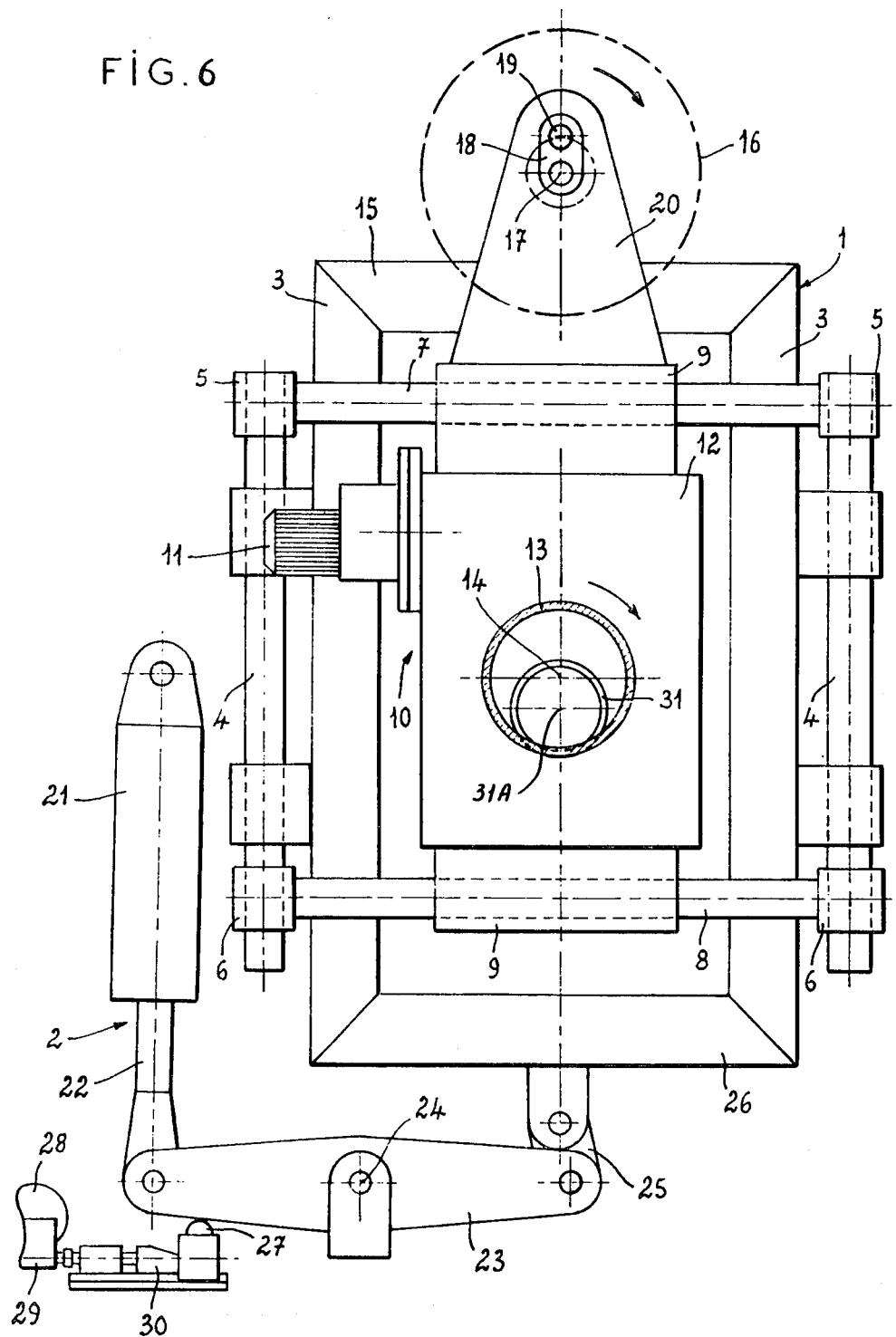

FIGS. 3–6 show the cutting process every 90° thereafter. In FIG. 6 the operation is complete, the tube 31 cut completely through. The accurate motion of the inner support 10 relative to the stationary frame 1 during the cut as well as the accurately controlled depth of cut leaves perfectly smooth, planar, and chamfered ends on the two tube sections the tube 31 is cut into.

Figure 7:
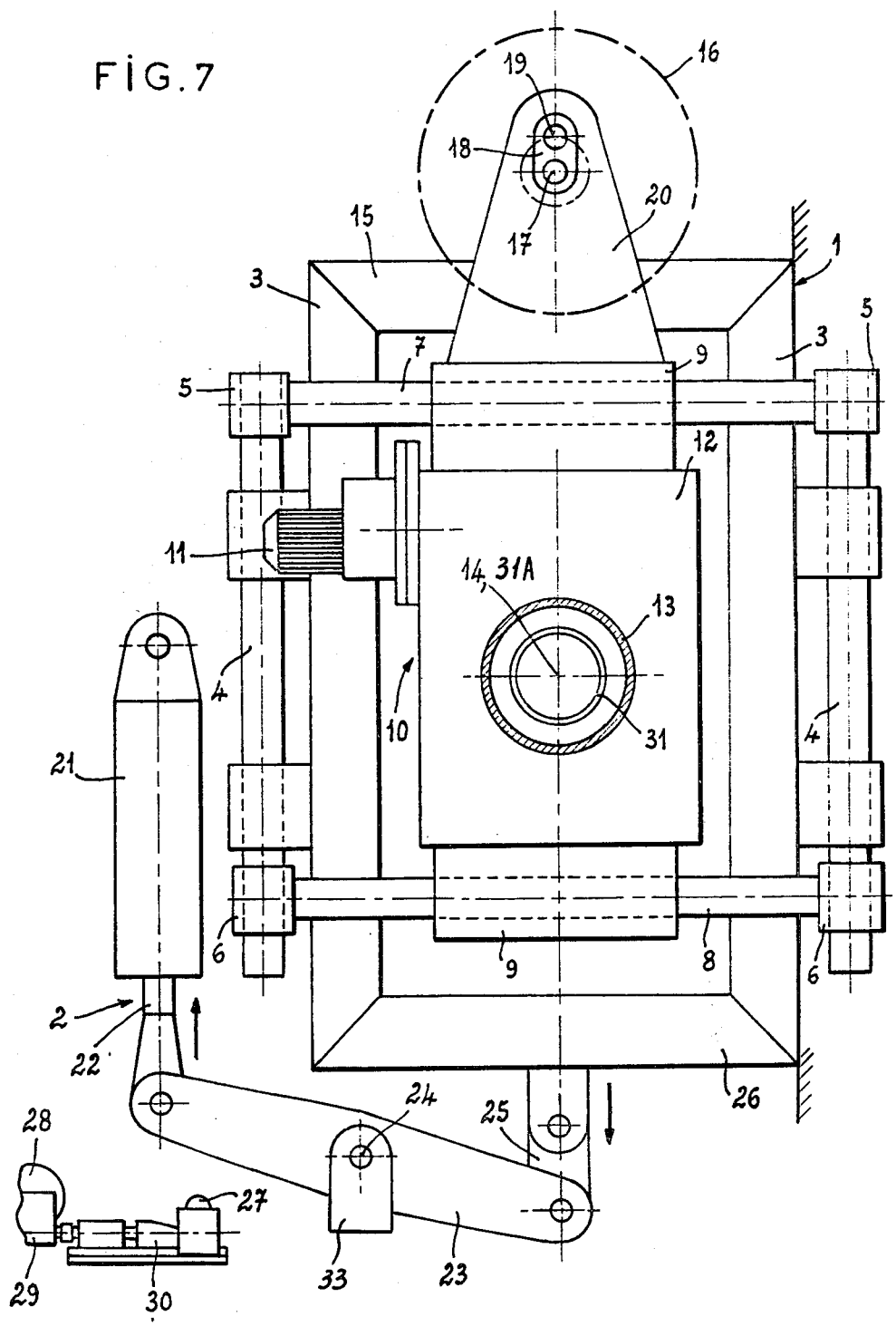

Then as seen in FIG. 7 the cylinder 21 is retracted to lower the frame 1 and support 2 and the motor 16 is arrested so the saw axis 14 again lies on the axis of the tube 31. In this position the cut-off piece of the tube 31 can be taken away and the tube can advanced to make another cut in it.

With this system the stop 27 is basically set in dependence on tube wall thickness, and the length of the crank is determined by the tube diameter. If either of these dimensions changes it can therefore be adjusted for independently of the other, and neither adjustment is particularly onerous.

I claim:

1. A ring-blade saw for cutting a tube generally centered on a tube axis, the saw comprising:
   a substantially stationary base;
   an outer frame displaceable in a straight line in a plane;
   means connected between the base and the outer frame for displacing the frame relative to the base in the plane;
   an inner support;
   means including a first guide carrying the support on the frame for movement relative to the frame in a first straight direction lying in the plane;
   means including a second guide carrying the support on the frame for movement of the support relative to the frame in a second straight direction lying in the plane and perpendicular to the first direction;
   a generally planar, annular and internally toothed saw blade lying generally on the plane, centered on a saw axis generally perpendicular to the plane, and carried on the support, whereby the tube to be cut can extend through the blade with its axis parallel to or on the blade axis;
   blade-actuation means on the support for rotating the blade thereon about the saw axis; and
   drive means including a crank connected between the frame and the support for orbiting the saw axis about the tube axis of a tube extending perpendicular to the plane through the blade, whereby when the blade is being rotated and orbited it can cut through the tube.

2. The ring-blade saw defined in claim 1 wherein the crank has one end pivoted on the frame about an axis perpendicular to the plane and another end pivoted on the frame about an axis also perpendicular to the plane but offset from the other crank axis.

3. The ring-blade saw defined in claim 2 wherein the drive means includes a motor carried on the frame and having an output shaft forming the other crank axis.

4. The ring-blade saw defined in claim 1 wherein the blade-actuation means includes a motor and transmission fixed on the support and connected to the blade.

5. The ring-blade saw defined in claim 1 wherein each of the guides includes at least one rod extending in the respective direction and a slide displaceable along the respective rod in the respective direction.

6. The ring-blade saw defined in claim 5 wherein the slides are each constituted as roller-type bearings.

7. The ring-blade saw defined in claim 1 wherein the first and second guides each include two respective first and second rods extending parallel to the respective directions and at least two respective first and second slides displaceble along the respective rods in the respective directions.

8. The ring-blade saw defined in claim 7 wherein the first rods are fixed on the frame, the first slides being fixed on the ends of the second rods, the second slides being fixed on the support.

9. The ring-blade saw defined in claim 1 wherein the first direction is vertical and the second direction is horizontal.

10. The ring-blade saw defined in claim 1 wherein the means for displacing the frame relative to the base includes:
    a lever pivoted on the base;
    a fluid-powered actuator connected between the base and the lever for pivoting same; and
    a rigid link connected between the lever and the frame.

11. The ring-blade saw defined in claim 1, further comprising:
    an adjustable stop operatively engageable between the frame and the base for limiting displacement of the frame relative to the base along the straight line, whereby the stop is positioned in accordance with the size of the tube being cut.

12. The ring-blade saw defined in claim 11 wherein the adjustable stop is provided with
    a stop drive motor;
    a wedge engageable with the stop; and
    transmission means connected between the wedge and stop motor for displacing the wedge and stop by means of the motor.

13. The ring-blade saw defined in claim 12 wherein the drive stop motor is a stepping motor.

14. The ring-blade saw defined in claim 1, further comprising:
    support means for holding the tube to be cut fixedly in a position extending through the blade.

15. The ring-blade saw defined in claim 14 wherein the support means includes a support surface oriented to hold the lowermost portion of the tube at a predetermined level regardless of workpiece size.

16. The ring-blade saw defined in claim 1 wherein the blade and the tube have inner radii and the crank has a length equal generally to the difference therebetween.

* * * * *